US008836344B2

(12) United States Patent
Habib et al.

(10) Patent No.: US 8,836,344 B2
(45) Date of Patent: Sep. 16, 2014

(54) INTRUSION DETECTION AND TRACKING SYSTEM

(75) Inventors: Toni S. Habib, Marlborough, MA (US); Wassim S. Habib, Dover, MA (US); Teh-Kuang Lung, Boxborough, MA (US)

(73) Assignee: Raytheon Company, Waltham, MA (US)

( * ) Notice: Subject to any disclaimer, the term of this patent is extended or adjusted under 35 U.S.C. 154(b) by 521 days.

(21) Appl. No.: 13/188,596

(22) Filed: Jul. 22, 2011

(65) Prior Publication Data

US 2012/0025849 A1 Feb. 2, 2012

Related U.S. Application Data

(66) Substitute for application No. 61/368,159, filed on Jul. 27, 2010.

(60) Provisional application No. 61/367,986, filed on Jul. 27, 2010, provisional application No. 61/370,918, filed on Aug. 5, 2010.

(51) Int. Cl.
| | |
|---|---|
| *G01R 27/28* | (2006.01) |
| *G01R 27/04* | (2006.01) |
| *H04M 11/04* | (2006.01) |
| *G01S 5/02* | (2010.01) |
| *G08B 13/24* | (2006.01) |

(52) U.S. Cl.
CPC ........... *G08B 13/2491* (2013.01); *G01S 5/0289* (2013.01)
USPC ......... 324/647; 324/616; 342/126; 455/404.2

(58) Field of Classification Search
CPC G01S 5/0289; G08B 13/2491; G08B 13/126; G08B 25/009; G01D 4/004
USPC ................... 324/647, 616; 340/567; 342/126; 455/404.2
See application file for complete search history.

(56) References Cited

U.S. PATENT DOCUMENTS

| | | |
|---|---|---|
| 6,710,736 B2 | 3/2004 | Fullerton et al. |
| 6,832,251 B1 | 12/2004 | Gelvin et al. |

(Continued)

FOREIGN PATENT DOCUMENTS

JP     2006172072 A    6/2006

OTHER PUBLICATIONS

Notification of Transmittal of the International Search Report and the Written Opinion of the International Searching Authority, or the Declaration, PCT/US2010/047253, date of mailing Nov. 26, 2010, 4 pages.

(Continued)

*Primary Examiner* — Melissa Koval
*Assistant Examiner* — Farhana Hoque
(74) *Attorney, Agent, or Firm* — Daly, Crowley, Mofford & Durkee, LLP

(57) ABSTRACT

In one aspect, a method to detect an object in an area includes forming a wireless network among a plurality of nodes, each of the nodes being configured to generate an electromagnetic field (EMF) in the area and determining changes in the EMF between two nodes based on: a first difference in received signal strength values between a previously determined received signal strength value and a currently determined received signal strength value, a second difference in received signal strength values between the currently determined received signal strength value and an average received signal strength value and a third difference in link quality values between a previously determined link quality value and a currently determined link quality value. The method further comprises detecting the object based on the changes in the EMF.

23 Claims, 13 Drawing Sheets

(56) References Cited

U.S. PATENT DOCUMENTS

| | | | |
|---|---|---|---|
| 7,088,236 | B2 | 8/2006 | Sørensen |
| 7,126,951 | B2 | 10/2006 | Belcea et al. |
| 7,129,886 | B2 | 10/2006 | Hall et al. |
| 7,154,392 | B2 | 12/2006 | Rastegar et al. |
| 7,295,109 | B2 | 11/2007 | Kobayashi |
| 7,369,047 | B2 | 5/2008 | Broad et al. |
| 7,409,716 | B2 | 8/2008 | Barnett et al. |
| 7,733,220 | B2 | 6/2010 | Libby |
| 2002/0094780 | A1 | 7/2002 | Payton et al. |
| 2003/0043073 | A1 | 3/2003 | Gray et al. |
| 2003/0228035 | A1 | 12/2003 | Parunak et al. |
| 2004/0021599 | A1 | 2/2004 | Hall et al. |
| 2004/0080415 | A1 | 4/2004 | Sorenson |
| 2005/0055568 | A1 | 3/2005 | Agrawala et al. |
| 2006/0007001 | A1* | 1/2006 | Rastegar et al. ............. 340/552 |
| 2007/0184852 | A1* | 8/2007 | Johnson et al. ............ 455/456.1 |
| 2008/0018464 | A1* | 1/2008 | van Doorn et al. ........... 340/553 |
| 2008/0143529 | A1* | 6/2008 | Gauvreau ...................... 340/567 |
| 2008/0238668 | A1* | 10/2008 | Johnsen ........................ 340/541 |
| 2009/0040952 | A1 | 2/2009 | Cover et al. |
| 2009/0315699 | A1* | 12/2009 | Satish et al. .................. 340/533 |
| 2011/0063110 | A1 | 3/2011 | Habib et al. |
| 2011/0063111 | A1 | 3/2011 | Habib et al. |

OTHER PUBLICATIONS

Written Opinion of the International Searching Authority, PCT/US2010/047253, date of mailing Nov. 26, 2010, 4 pages.

Kim Zetter, "Wireless Network Signals Produce See-Through Walls", Oct. 2, 2009, http://www.wired.com/threatlevel/2009/10/see-through-walls.

"Wireless Network Modded to See Through Walls", MIT Technology Review, the physics arXiv blog, Oct. 1, 2009, http://www.technologyreview.com/blog/arxiv/24193/.

Joey Wilson and Neal Patwari, "Through-Wall Tracking Using Variance-Based Radio Tomography Networks", http://arxiv.org/abs/0909.5417, submitted on Sep. 29, 2009 (v1), last revised Oct. 1, 2009 (this version, v2).

Arora, et al.; "A line in the sand: a wireless sensor network for target detection, classification, and tracking;" Elsevier, Computer Networks; vol. 46; Jul. 2004; pp. 605-634.

Becker, et al.; Experimental Study: Link Quality and Deployment Issues in Wireless Sensor Networks; Networking 2009; LNCS 5550, pp. 14-25.

Dai, et al.; Light-Weight Target Tracking in Dense Wireless Sensor Networks; Fifth International Conference on Mobile Ad-hoc and Sensor Networks; Dec. 2009 (Abstract Only).

Gungor, et al; Resource-Aware and Link Quality Based Routing Metric for Wireless Sensor and Actor Networks; IEEE Xplore Digital Library; Jun. 2007 (Abstract Only).

Hussain, et al.; Using Received Signal Strength Variation for Surveillance in Residential Areas; http://www.xbow.com; Mar. 2008, 6 pages.

Kang, et al.; "Power-Aware Markov Chain Based Tracking Approach for Wireless Sensor Networks;" Wireless Communications and Networking Conference, IEEE; Mar. 2007.

Kaltiokallio, et al.; "Distributed RSSI processing for intrusion detection in indoor environments;" The ACM Portal; Apr. 2010 (Abstract Only).

Kurschi, et al.; "A Two-Layered Deployment Scheme for Wireless Sensor Network based Location Tracking;" Fifth International Conference on Information Technology: New Generation (itng 2008); Apr. 2008 (Abstract Only).

Ouyang, et al.; "A Comprehensive Real-Time High-Performance Object-Tracking Approach for Wireless Sensor Networks;" Fifth International Conference on Mobile Ad-hoc and Sensor Networks; Dec. 2009 (Abstract Only).

Xu, et al.; "A Novel Localization Algorithm Based on Received Signal Strength Indicator for Wireless Sensor Networks;" International Conference on Computer Science and Information Technology; Aug.-Sep. 2008 (Abstract Only).

Yan, et al., "RPLRE: A Routing Protocol Based on LQI and Residual Energy for Wireless Sensor Networks;" First International Conference on Information Science and Engineering; Dec. 2009 (Abstract Only).

Federal Laboratory Consortium for Technology Transfer, NewsLink Magazine, Oct./Nov. 2010; (http://www.federallabs.orq/news/classifieds/), 1 page.

U.S. Appl. No. 12/953,821, filed Nov. 24, 2010, 25 pages.
U.S. Appl. No. 12/562,036, filed Sep. 17, 2009.
U.S. Appl. No. 12/953,821, filed Nov. 24, 2010.
U.S. Appl. No. 61/368,159, filed Jul. 27, 2010.
U.S. Appl. No. 61/367,986, filed Jul. 27, 2010.
U.S. Appl. No. 61/370,918, filed Aug. 5, 2010.

Notification of Transmittal and the International Preliminary Report on Patentability (Chapter II of the Patent Cooperation Treaty), PCT/US2010/047253, Date of mailing Feb. 17, 2012, 8 pages.

Cover, Mathew B. and Anderson, David R.; "Microwave Tomography", University of Iowa, Mar. 14, 2007, 6 pages.

Notification of Transmittal of the International Search Report and the Written Opinion of the International Searching Authority, or the Declaration, PCT/US2011/044972, date of mailing Feb. 14, 2012, 7 pages.

Written Opinion of the International Searching Authority, PCT/US2011/044972, date of mailing Feb. 14, 2012, 8 pages.

Notification Concerning Transmittal of International Preliminary Report on Patentability (Chapter 1 of the Patent Cooperation Treaty), PCT/US2011/044972, date of mailing Feb. 7, 2013, 2 pages.

Written Opinion of the International Searching Authority, PCT/US2011/044972, date of mailing Feb. 7, 2013, 7 pages.

Invitation to Pay Additional Fees with Partial International Search Report, date of mailing Dec. 6, 2011, PCT/US2011/044972, 9 pages.

Kaltiokallio, et al.; "Poster Abstract, Distributed RSSI Processing for Intrusion Detection in Indoor Environments;" The ACM Portal; Apr. 2010, 2 pages.

Wilson, et al.; "Radio Tomographic Imaging with Wireless Networks," IEEE Transactions on Mobile Computing, vol. 9, No. 5, May 2010, 12 pages.

Youssef, et al.; "Challenges: Device-free Passive Localization for Wireless Environments," Sep. 9, 2007, XP007919817, Proceedings of the 13th Annual ACM International Conference on Mobile Computing and Networking, Montreal Quebec, Canada, 8 pages.

Notice of Allowance dated Nov. 23, 2011 for U.S. Appl. No. 12/562,036, filed Sep. 17, 2009, 16 pages.

Examiner's Report dated Nov. 12, 2013 for CA Pat. Appl. No. 2772387, 2 pages.

Response to Office Action from Foreign Associate date Jul. 16, 2013 for EP Pat. Appl. No. 11745853.9, 19 pages.

Notice of Allowance dated Feb. 12, 2014 for U.S. Appl. No. 12/953,821, 18 pages.

\* cited by examiner

INTRUSION DETECTION AND TRACKING SYSTEM

RELATED APPLICATIONS

This application claims priority to Provisional Application Ser. No. 61/367,986 filed on Jul. 27, 2010 and titled "SAFETY AND RESCUE MONITORING IN INTERIOR SPACES USING ELECTROMAGNETIC FIELD (EMF) DISTURBANCE," which is incorporated herein by reference in its entirety; Provisional Application Ser. No. 61/370,918 filed on Aug. 5, 2010 and titled "ENHANCED CHEMICAL, RADIOLOGICAL, BIOLOGICAL, AND NUCLEAR, EXPLOSIVE AND FIREARM DETECTION AND TRACKING SYSTEM," which is incorporated herein in by reference its entirety; and Provisional Application Ser. No. 61/368,159 filed on Jul. 27, 2010 and titled "VOLUMETRIC DETECTION AND TRACKING SYSTEM," which is incorporated herein by reference in its entirety.

BACKGROUND

Area intrusion detection based on ad-hoc wireless sensor networks requires the use of energy demanding and relatively costly sensors for their operation. Reliable accurate sensors with low sensitivity to environmental changes are both costly and power demanding. These limitations render such networks unsuitable for use in area (perimeter or border) intrusion detection applications where low cost, extended sensing range and power autonomy are three of the most important requirements driving the design of the system. Such conflicting performance and cost requirements frequently lead to compromises in the design of wireless sensor networks.

New designs for lower cost sensors appear continuously in the market. However, in an attempt to reduce production cost, greater demand is being imposed on the processing unit of the wireless nodes of the network. This increased demand increases energy consumption by the nodes which, in turn, negatively impacts energy autonomy of the system. Attempts have been made to increase the range of the sensors from a few feet to ten feet or greater. However, the increased cost and complexity of the enhanced sensors rendered them unsuitable for wireless network area intrusion detection application. More complex software algorithms were developed to produce energy efficient wireless networks for the purpose of maximizing the autonomy of wireless network intrusion detection systems. The majority of these attempts focused on producing efficient routing algorithms for the purpose of minimizing the average transmission time of the wireless nodes of the sensor networks, thus reducing their energy consumption. However, this required the use of an increased number of higher power processing units.

SUMMARY

In one aspect, a method to detect an object in an area includes forming a wireless network among a plurality of nodes, each of the nodes being configured to generate an electromagnetic field (EMF) in the area and determining changes in the EMF between two nodes based on: a first difference in received signal strength values between a previously determined received signal strength value and a currently determined received signal strength value, a second difference in received signal strength values between the currently determined received signal strength value and an average received signal strength value and a third difference in link quality values between a previously determined link quality value and a currently determined link quality value. The method further comprises detecting the object based on the changes in the EMF.

In another aspect, a system to detect an object in an area includes a plurality of nodes. Each node includes at least one processor and is configured to generate an electromagnetic field (EMF) in the area. Each node is configured to determine changes in the EMF between two nodes based on a first difference in received signal strength values between a previously determined received signal strength value and a currently determined received signal strength value, a second difference in received signal strength values between the currently determined received signal strength value and an average received signal strength value and a third difference in link quality values between a previously determined link quality value and a currently determined link quality value. The system detects an object based on changes in the EMF.

In a further aspect, an article includes a non-transitory machine-readable medium that stores executable instructions to detect an object. The instructions cause a machine to determine changes in the EMF between two nodes based on a first difference in received signal strength values between a previously determined received signal strength value and a currently determined received signal strength value, a second difference in received signal strength values between the currently determined received signal strength value and an average received signal strength value and a third difference in link quality values between a previously determined link quality value and a currently determined link quality value.

One or more of the aspects above may include one or more of the following features. The first difference in received signal strength values includes a difference in received signal strength indicator (RSSI) values between a previously determined RSSI value and a currently determined RSSI value, the second difference in received signal strength values includes a difference in RSSI values between the currently determined RSSI value and an average RSSI value, and wherein the third difference in link quality values includes a difference in link quality indicator (LQI) values between a previously determined LQI value and a currently determined LQI value. Determining changes in the EMF includes determining a measurement value at a first node based on a signal received at the first node from a second node, the MV being equal to:

$$|k\Delta_1|+|l\Delta_2|+|m\Delta_3|,$$

where, k, l and m are constants, $\Delta_1$ is the first difference in received signal strength values, $\Delta_2$ is the second difference in received signal strength values and $\Delta_3$ is the third difference in link quality values.

One or more of the aspects above may also include one or more of the following features: transmitting the measurement value from the first node to an access point if the measurement value is above a measurement value threshold, transmitting a detection from the access point to a controller if a number of measurement values received at the access point in a cycle exceeds a detection threshold, tracking the object at the controller in response to detections received from the access point, disposing the plurality of nodes throughout a building, disposing a first node on a first building and disposing a second node on a second building and correlating the object detected by determining changes in the EMF with a detection by the sensor. Transmitting a detection may include transmitting a detection of one of a human, a vehicle and an airplane. Correlating the object detected by determining changes in the EMF with a detection by the sensor may include con-elating the object detected by analyzing changes in the EMF with a detection by a chemical, radiological, biological, and nuclear (CRBN), explosives, and/or firearm materials (CBRNE) sensor.

One or more of the aspects above may further include one or more of the following features receiving, at one or more of the plurality of nodes, data from a beacon and correlating the object detected with the data from the beacon. Receiving data from the beacon may include receiving at least one of a beacon ID and vital data collected by a wearer of the beacon. The vital data may include body temperature, heart rate, oxygen supply level, surrounding hazardous fumes, and/or gasses measured by sensors integrated into the beacon.

DETAILED DESCRIPTION

Described herein are techniques to detect an intrusion into a monitored area. In one example, the intrusion is by an object (e.g., a vehicle, an animal, a human and so forth). The techniques described herein monitor changes in an electromagnetic field (EMF). In particular, if an object moves between a receiver and a transmitter EMF characteristics from the perspective of the receiver changes. For example, the receiver will determine whether a link quality between the transmitter and the receiver has changed. In another example, the receiver will determine whether a received signal strength of a transmitted signal from the transmitter has changed. In one particular example, when a first node receives a signal from a second node, the second node will determine a received signal strength indicator (RSSI) and a link quality indicator (LQI) based on the signal received from the first node. As will be discussed herein, changes in received signal strength (e.g., RSSI) and link quality (e.g., LQI) are used to determine if an intrusion has occurred and to track an intruder.

The techniques described herein are cost effective approaches to intrusion detection and tracking using the disturbance of the electromagnetic field from low-cost commercial off-the-shelf (COTS) transceivers in nodes to detect and track targets of interest. The techniques described herein also eliminate the need of costly power and communication infrastructures associated with current technologies. Unburdened by such infrastructure requirements, these techniques can dramatically change how and where perimeter and area (or border/perimeter) detection will be performed to better protect critical facilities, sensitive areas and the like.

Figure 1:
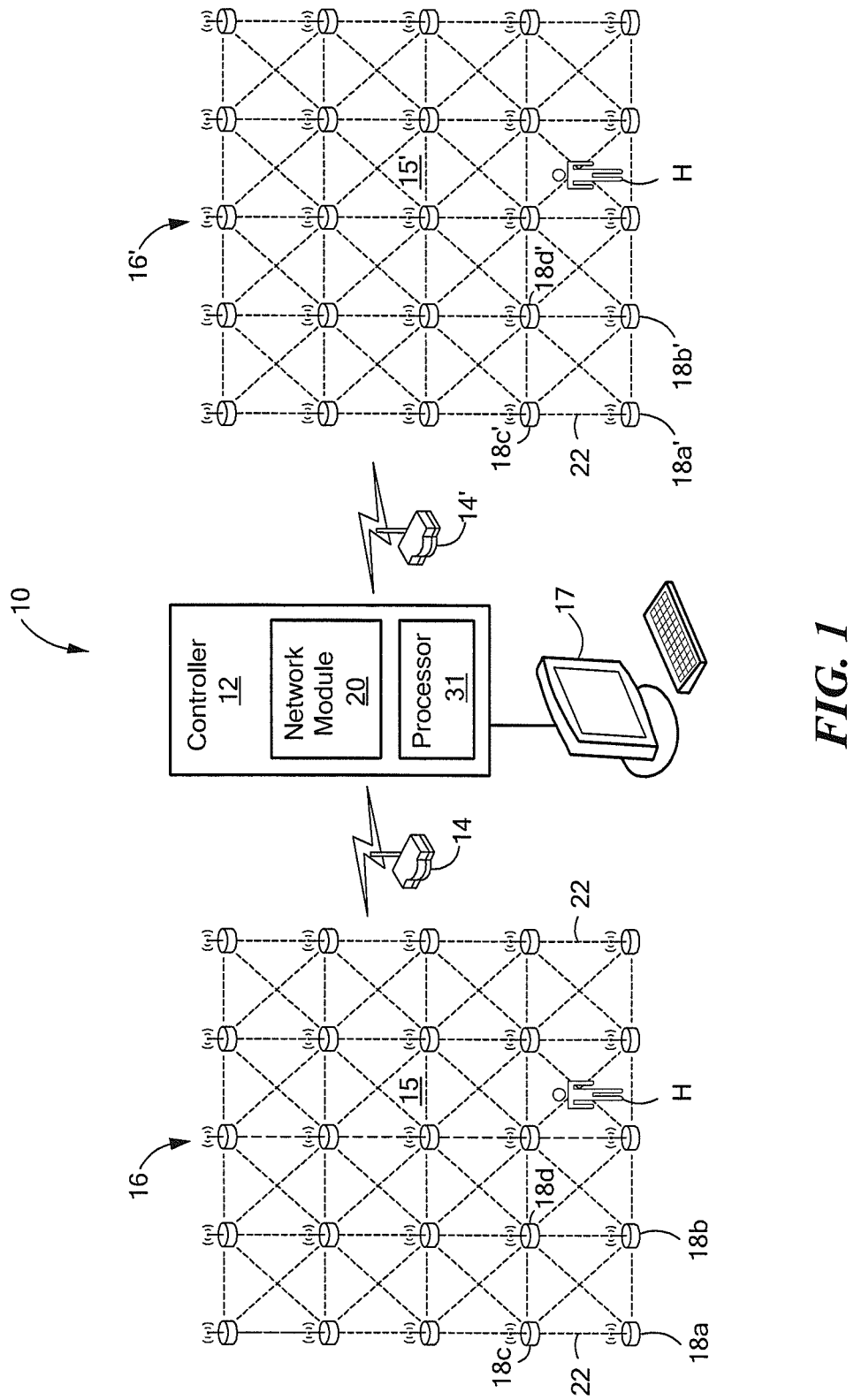
FIG. 1 is a block diagram of an example of an intrusion detection and tracking system.

Referring to FIG. 1, an intrusion detection and tracking system 10 to monitor areas (e.g., an area 15 and an area 15') for intrusion by objects (e.g., by a human H) includes a controller 12, access points (e.g., an access point 14 and access point 14'), wireless networks (e.g., a wireless network 16 and a wireless network 16') and a workstation 17. For example, the wireless network 16 monitors the area 15 and provides data wirelessly to the access point 14 and the wireless network 16' monitors the area 15' and provides data wirelessly to the access point 14'.

The access points 14, 14' are used to form a data link between the networks 16, 16' and the controller 12. In one example, each of the access points 14, 14' provides data wirelessly to the controller 12. In one particular example, the access points 14', 14' are routers.

Each of the wireless networks 16, 16' includes nodes disposed in their respective areas 15, 15' used for intrusion detection. For example, the wireless network 16 includes a node 18a, a node 18b, a node 18c and so forth for monitoring area 15 and the wireless network 16' includes node 18a', a node 18b', a node 18c' and so forth for monitoring area 15'. As used herein, a node from wireless network 16 is referred to generically as node 18 and a node from wireless network 16' is referred generically as node 18'. Nodes communicate with other nodes through a wireless link 22. Each of the nodes 18, 18' processes EMF data (e.g., using a process 50 (FIG. 4A)) and reports changes in the EMF to their respective access point 14, 14' to process (e.g., using a process 70 (FIG. 4B)). The access points 14, 14' report intrusion detections to the controller 12 to process (e.g., using a process 80 (FIG. 4C)).

In one example, the nodes 18, 18' in the networks 16, 16' use a communication protocol when communicating with each other that includes values for a received signal strength indicator (RSSI) and a link quality indicator (LQI) in any transmitted frame. For example, when a node 18a receives a signal from another node 18b, the node 18a fills in the RSSI and LQI data (e.g., in a header) based on the signal it received from the node 18b. In one example, the communication protocol is the IEEE 802.15.4 communication protocol, which is intended for industrial and medical applications. It should be appreciated that though IEEE 802.15.4 is presently used other protocols may later be adopted that include terms similar to RSSI and LQI.

In one example, the nodes 18, 18' are system-on-chip devices (SoCs) deployed in a grid along a perimeter or border of the respective areas 15, 15' to be monitored, as depicted in FIG. 1, to form the ad-hoc wireless networks 16, 16'. While FIG. 1 show the nodes 18, 18' forming two orderly grids, it will be apparent to one of ordinary skill in the art that the nodes 18, 18' need not be located in an orderly manner to form the ad-hoc wireless networks 16, 16'. Furthermore, the number of networks is not limited to one or two networks but may be expanded to a larger number. Also, the number of nodes 18, 18' are not limited to a number shown in FIG. 1; but rather, there may be more or less nodes and may be constrained by an ability of a respect access point 14, 14' to process the data in a timely manner and/or have sufficient bandwidth. Moreover, the nodes 18, 18' may be arranged to cover three-dimensions (3-D) in order to provide surveillance over a volume (e.g., buildings). Thus, use of the word "area" as used herein may also refer to a volume space.

In the system 10, the nodes 18, 18' are scattered on a surface in a way that would setup an electromagnetic field that would cover the respective areas 15, 15' to provide surveillance. The spacing of the nodes 18, 18' is dependent on the overall size of the areas 15, 15' for surveillance, the desired detection accuracy, the corresponding power consumption by each node to attain the desired accuracy and so forth.

The controller 12 includes a network module 20 and a processor 21. The network module 20 is configured to monitor and control transmission power and power consumption of the nodes 18, 18' as well as other parameters at the nodes 18. 18', the access points 14, 14' and the controller 12. In addition, the network module 20 may be used to set parameters such as a measurement value threshold, a detection threshold value and configuration parameters. The processor 21 processes the data received from the access points 14, 14' to correlate and track intrusion detections.

The workstation 17 may be used by a user to monitor or modify the network module 20. The user can monitor network health, control or activate individual nodes 18, 18' and/or remotely program the nodes 18, 18' through the network module 20 using the workstation 17. The workstation 17 may also be used to adjust the signal strength processing, threshold and detection parameters and power consumption at each node 18, 18' through the network module 20.

Figure 2A:
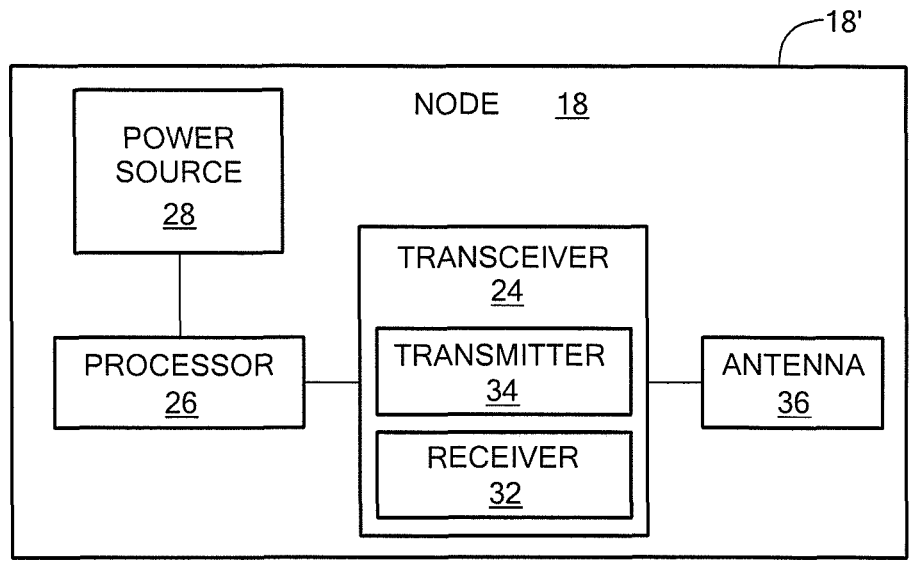
FIG. 2A is a block diagram of an example of a node in the intrusion detection and tracking system.

Referring to FIG. 2A, in one example, each node 18, 18' includes a transceiver 24 that is coupled to a processor 26 and an antenna 36. The processor 26 is powered by a power source 28 (e.g., a battery, a battery 28 that stores energy provided by solar panels and so forth). The processor 26 receives and processes data received from the transceiver 24, for example, from other nodes 18, 18' and provides detection data to the access points, 14, 14'. In other examples, the processor 26 receives and processes data (e.g., configuration data) received from the transceiver 24 sent by the controller 12 through the access points, 14, 14'.

As the transceiver 24 radiates outward from the antenna 36, electromagnetic waves are reflected by the obstacles they strike and their directions of travel are altered. A fraction of their energy is also absorbed by the struck obstacle causing attenuated waves that proceed in the original direction of travel. As a result, different out-of-phase direct, reflected, and absorbed waves are received by the antenna 36 of other nodes, and their instantaneous vector sum determines the received signal energy. These EMF changes can be detected by detecting changes in received signal strength (e.g., RSSI) and changes in link quality (e.g., LQI).

Figure 2B:
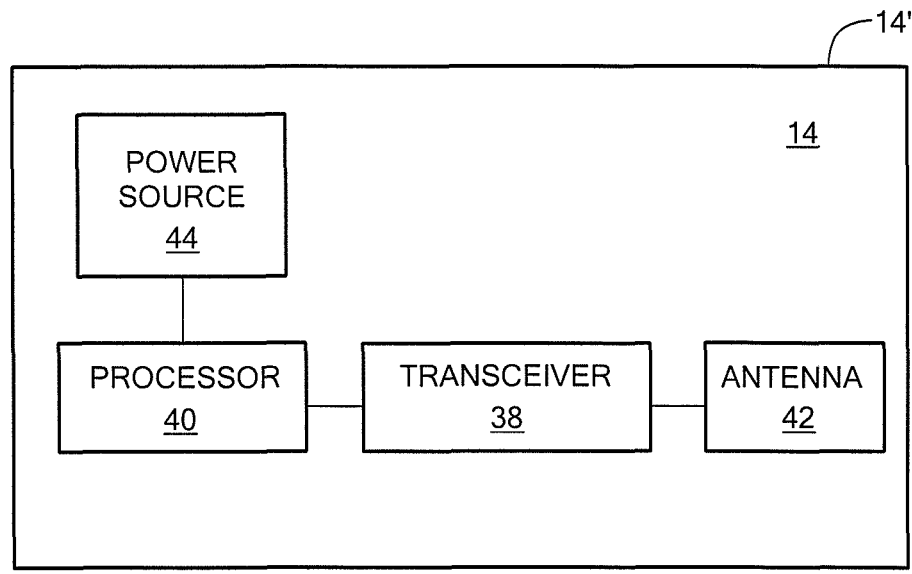
FIG. 2B is a block diagram of an example of an access point in the intrusion detection and tracking system.

Referring to FIG. 2B, in one example, each access point 14, 14' includes a transceiver 38 that is coupled to a processor 40 and an antenna 42. The processor 40 is powered by a power source 44 (e.g., a battery, a battery and solar panels, a wall outlet and so forth). The processor 40 receives and processes data received from the transceiver 38, for example, from the nodes 18, 18' and provides the data to the controller 12. The access points 14, 14' may also receive data (e.g., configuration data) from the controller 12 to provide to their respective nodes 18, 18' or to process at the access point 14, 14'.

Both the cost and the energy requirement of the system 10 are significantly reduced by eliminating the need for additional external sensors to detect intrusion in the vicinity of the nodes 18, 18'. Energy savings are achieved by completely eliminating the need for power to drive the additional external sensors and by considerably decreasing processing requirement needed to sample a signal. The communication protocol of the nodes 18, 18' of the wireless networks 16, 16' provides ready availability of intrusion sensing information without the need for extra processing power. In one example, the intrusion sensing range of each of the nodes 18, 18' in the wireless networks 16, 16' is increased to the full transmission range of each node transmitter 10.

Figure 3B:
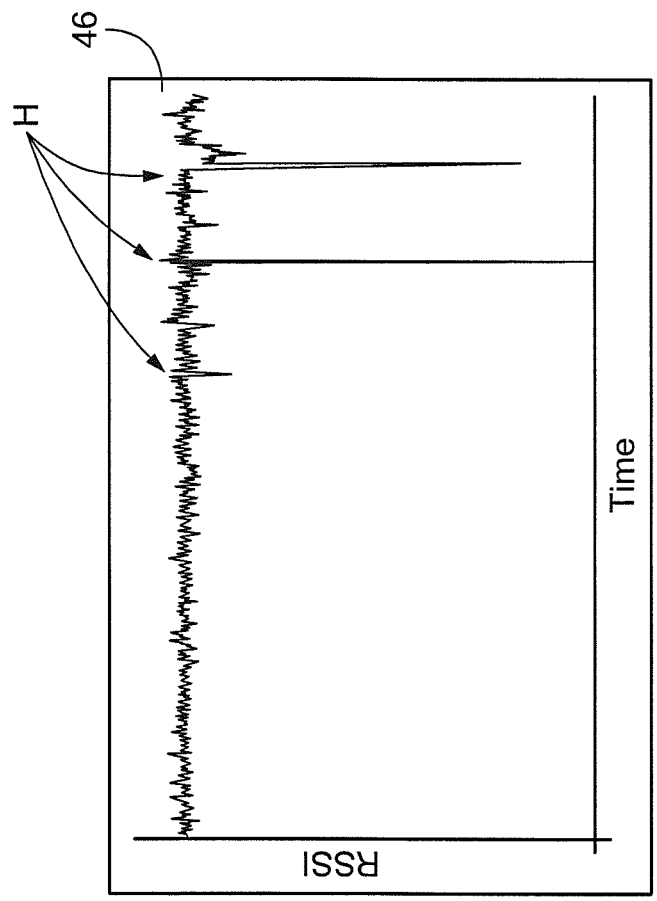
FIG. 3B is a graph of variations caused by the human target in FIG. 3A.
Figure 3A:
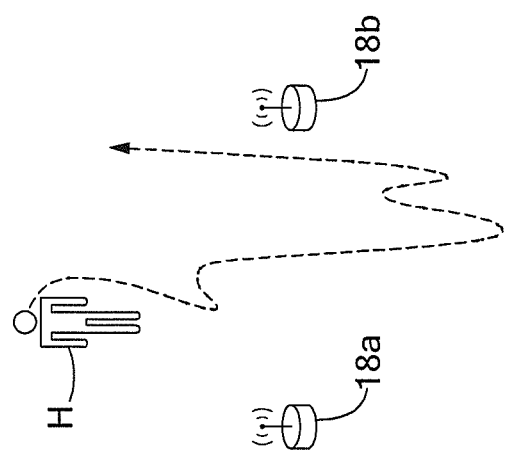
FIG. 3A is a perspective view of a human target travelling between two nodes in the intrusion detection system.

Referring to FIGS. 3A and 3B, for a stationary pair of nodes 18a, 18b, any change in the position of obstacles in the area 15, covered by a transmitter 34 of a node 18a will affect the received signal strength and the link quality values determined at the receiver 32 of the node 18b and visa versa. For example, a moving obstacle in the range of a transmitter 34 of the node 18a will change the values of the RSSI and the LQI determined at the receiver 32 of the node 18b, and these variations can be analyzed to both detect and track intrusions in the area 15. In FIG. 3B, a right-side of a graph 46 shows the effect on the RSSI value caused by a human target H arbitrarily moving between the pair of nodes 18a, 18b.

Figure 3D:
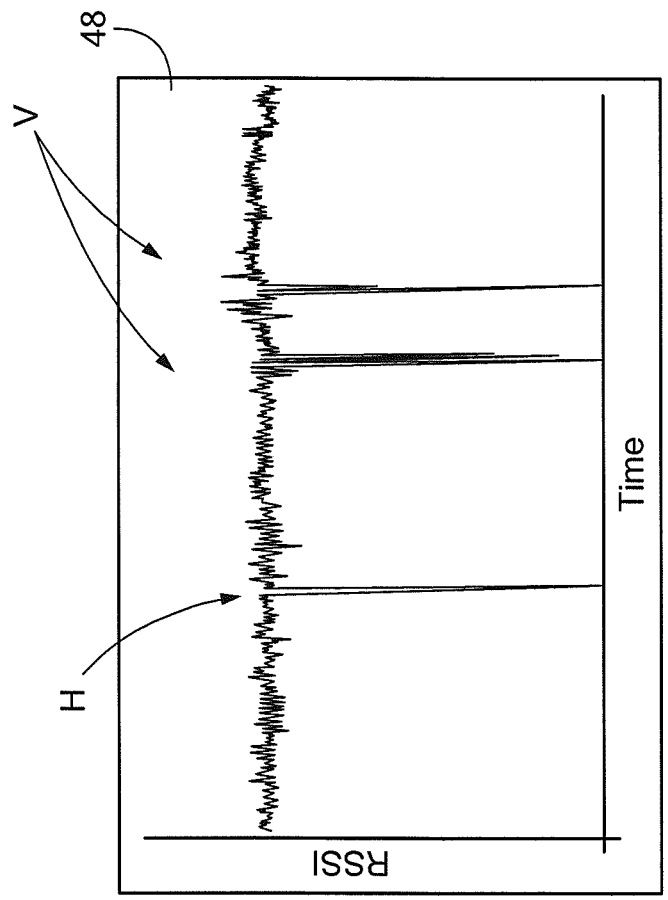
FIG. 3D is a graph of variations caused by the human target and the vehicle in FIG. 3C.
Figure 3C:
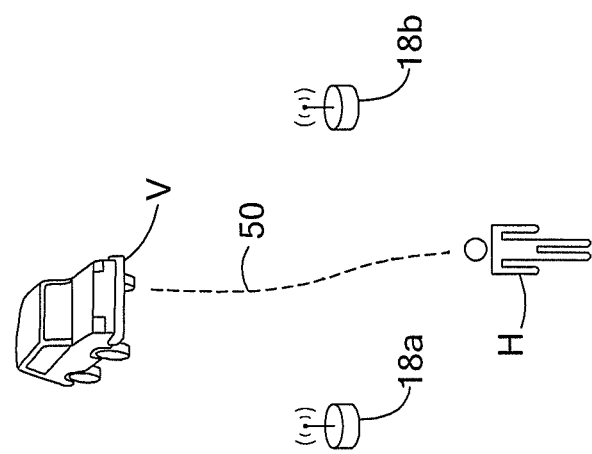
FIG. 3C is a perspective view of a human target and a vehicle between two nodes in the intrusion detection system.

FIGS. 3C and 3D show an example wherein an obstacle passes between the nodes 18a, 18b spaced apart by about 25 feet in an outdoor setting with the transmitters 34 and receivers 32 of each node 18a, 18b using the IEEE 802.15.4 protocol, for example. The RSSI value is as reported by the receiver 32. In FIG. 3D, the RSSI variations in a left portion of a graph 48 are caused by a human target H walking along an approximate center line path 50 between the nodes 18a, 18b. A right portion of the graph 48 shows RSSI variations caused by a vehicle V (e.g., a ground vehicle) driven back and forth along the same path 50. While FIGS. 3B and 3D show changes in RSSI values when objects move near nodes 18a, 18b, corresponding changes in LQI can also occur though not depicted herein.

Figure 4A:
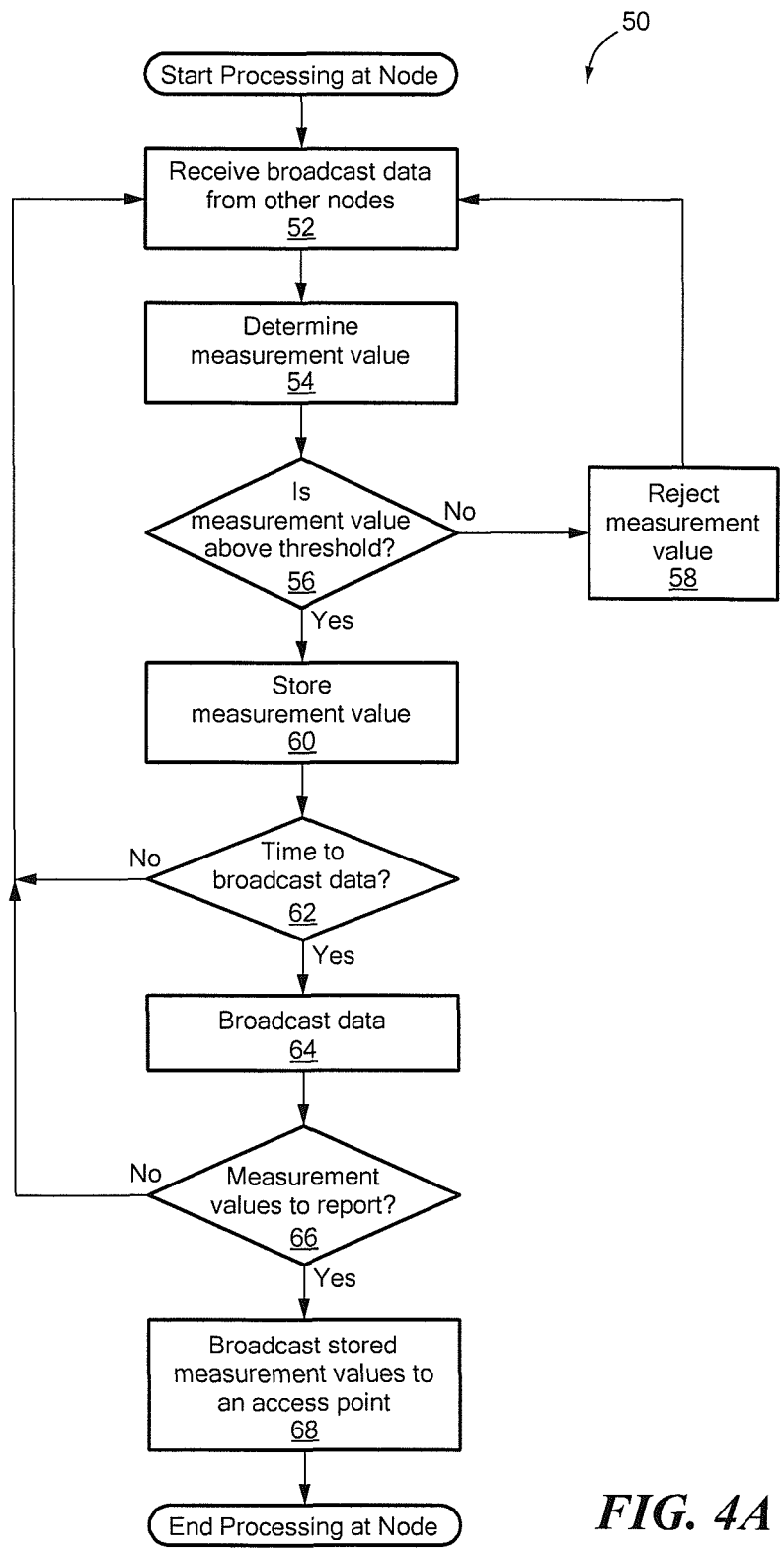
FIG. 4A is a flowchart of an example of a process performed at each node in the intrusion detection and tracking system.

Referring to FIG. 4A, an example of a process performed at each node 18, 18' is a process 50. Process 50 receives broadcasts from other nodes (52). For example, a node receives a ping from nodes within its neighborhood. In one example, the neighborhood includes one-hop neighbor nodes. In another example, the neighborhood includes two-hop neighbor nodes. In a further example, the neighborhood includes nodes capable of receiving transmissions from and sending transmission to the node 18a.

Process 50 determines a measurement value for each node pair (54). For example, if process 50 is performed at node 18a and the neighborhood includes one-hop neighbors, then the node pairs (from FIG. 1) would be nodes 18a, 18b; nodes 18a, 18c and nodes 18a, 18d. The node 18a would determine received signal strength and link quality values for each signal the node 18a receives.

In one example, the measurement value (MV) for a node pair is equal to:

$$|k\Delta_1| + |l\Delta_2| + |m\Delta_3|,$$ Equation 1 where, k, l and m are constants, $\Delta_1$ is a difference in received signal strength values between the previously determined received signal strength value and the currently determined received signal strength value, $\Delta_2$ is a difference in received signal strength values between the currently determined received signal strength value and the average determined received signal strength value and $\Delta_3$ is a difference in link quality values between the previously determined link quality value and the currently determined link quality value. In one particular example, received signal strength is RSSI and link quality is LQI. In some examples, the values of k, l and m is in the range $0.0 \leq k, l, m \geq 1.0$.

The constants k, l, m are determined during an initial set-up. In particular, after the nodes 18 are deployed in the area 15, a user calibrates the system to determine the constants, k, l, and m and uses the workstation 17 to enable the network module 20 to set the constants k, l, and m at the nodes 18, 18'.

In one particular example, the node 18a determines a measured value with the node 18b. If k, l, m are equal to 1, the currently determined RSSI value from node 18b is 2, the previously determined RSSI value from node 18b is 4, the average RSSI value from the node 18b is 5, the currently determined LQI value from node 18b is 7 and the previously determined RSSI value from node 18b is value 10, then the measurement value is equal to:

$$|1(4-2)|+|1(2-5)|+|1(10-7)|=2+3+3=8$$

Process 50 determines if the measurement value is above a measurement threshold value (56). If the measurement value is not above the measurement threshold value, process 50 rejects the measurement value (58) and returns to processing block 52 to receive broadcast data. If the measurement value is above the measurement threshold value, process 50 stores the measurement value (60).

Process 50 determines if it is time to broadcast data (62). If it is not time to broadcast data, process 50 returns to processing block 52 to receive broadcast data from the other nodes. If it is time to broadcast data, process 50 broadcasts data (64). For example, the node 18a pings the other nodes 18, which includes sending LQI data and RSSI data.

Process 50 determines if there are measurement values to report (64). If there are no measurement values to report, process 50 returns to processing block 52 to receive broadcast data from the other nodes. If there are measurement values to report, process 50 broadcasts the measured values (68). For example, the node 18a broadcasts the measurement values to the access point 14.

Figures 4B, 4C:
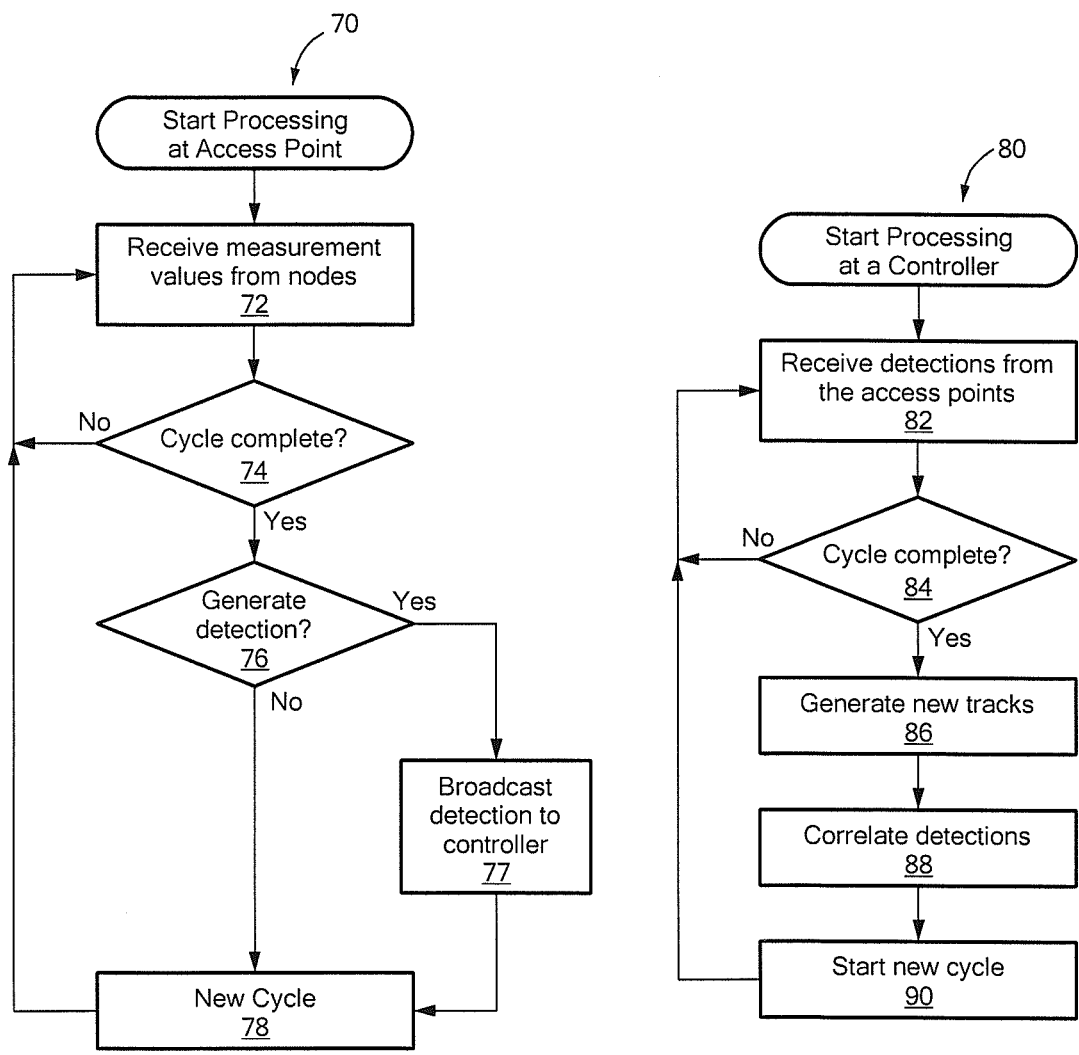
FIG. 4B is a flowchart of an example of a process performed at each access point in the intrusion detection and tracking system.
FIG. 4C is a flowchart of an example of a process performed at a controller in the intrusion detection and tracking system.

Referring to FIG. 4B, an example of a process performed at each access point 14, 14' is a process 70. Process 70 receives measurement values (72). For example, an access point 14' receives measurement values from the node 18a.

Process 70 determines if a cycle is complete (74). If the cycle is not complete, process 70 returns to processing block 72 to receive measurement values from the nodes. If the cycle is complete, process 70 determines if a detection should be generated (76). For example, if the number of measurement values received for a cycle is above a detection threshold value, a detection is generated. In some examples, the cycle may be any value between from about 0.5 seconds to about 10 seconds. If a detection should be generated, process 70 broadcasts a detection to the controller 12 (77) and starts a new cycle (78).

Referring to FIG. 4C, an example of a process performed at the controller 12 is a process 80. Process 80 receives detections from the access points 14, 14' (72). For example, the controller 12 receives measurement values from the access point 14.

Process 80 determine if a cycle is complete (84). If the cycle is not complete, process 90 returns to processing block 82 to receive detections.

If the cycle is complete, for each detection location (e.g., geographic location), process 80 generates new tracks (86) and correlates the detections (88). Track data may include track coordinates, speed, discrimination and so forth. New detections are correlated to either generate the new tracks (86) or update existing tracks. As will be shown herein, track data may also be correlated with other information provided to the controller 12. For example, additional sensors (e.g., a sensor 110 (FIGS. 6A and 6B)) may be added to the areas 15, 15' to provide additional information about a track. Further, a beacon (e.g., a beacon 220 worn by a human in FIG. 8) may also be introduced in the areas 15, 15' and provide additional information that may be correlated with a track.

Process 80 starts a new cycle (90) and returns to processing block 82 to receive detections.

Figure 5:
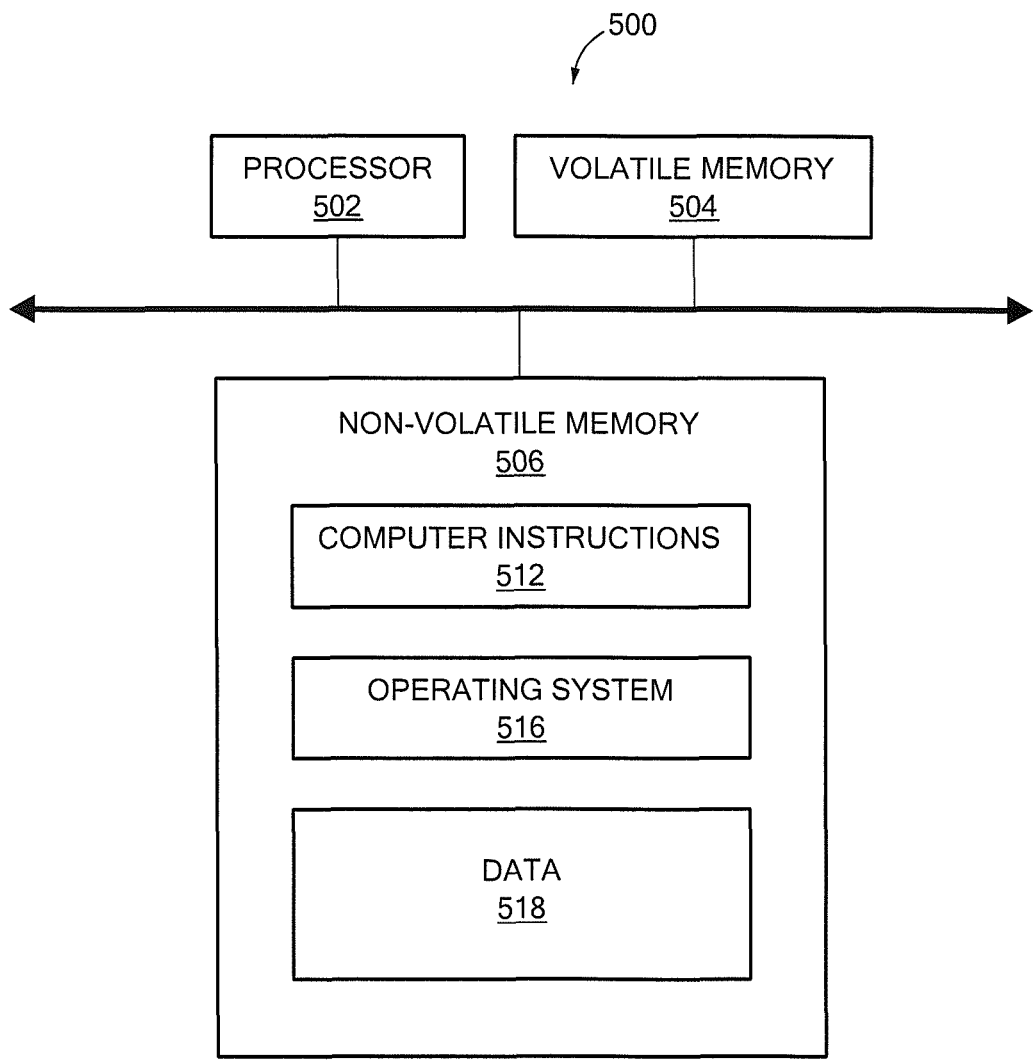
FIG. 5 is a block diagram of an example of a processor on which any or part of the processes of FIGS. 4A to 4C may be implemented.

Referring to FIG. 5, a processor 500 may be used to perform one or more of the processing blocks of the processes described herein (e.g., the processes 50, 70, 80). In one example, the processor 500 is an example of the processor 26 of the nodes 18, 18' to perform the process 50. In another example, the processor 500 is an example of the processor 40 of the access points 14, 14' to perform the process 70. In a further example, the processor 500 is an example of the processor 21 of the controller 12 to perform the process 80.

The processor 500 includes a processor 502, a volatile memory 504 and a non-volatile memory 506 (e.g., hard disk). Non-volatile memory 506 includes an operating system 516; data 518; and computer instructions 512 which are executed out of volatile memory 504 to perform all or part of processes 50, 70, 80.

As is also known, existing conventional chemical, radiological, biological, and nuclear (CRBN), explosives, and/or firearm detection systems do not provide accurate and reliable detection, localization, and tracking in non-contained wide spaces. In particular, conventional CRBN detection systems suffer from a variety of shortcomings including, but not limited, to an inability to reliably differentiate between positive detection versus the false detection due to environmental contamination such as wind carried chemicals. This results in an unacceptable false detection rate especially in highly active environment such as a war zone. Another shortcoming is that once detected, detections are not reliably and accurately tracked across time and space. Another shortcoming is that continuous cycling of the detection devices often occurs even when it is not warranted in the absence of any change in the environment or in the monitored area. This results in a high level of power consumption, ultimately requiring the use of power infrastructure or the rapid depletion of the power supply.

Thus, relying solely on CRBN, explosives and firearm detection devices alone often do not provide a desired level of security and/or safety as such devices are often unreliable and susceptible to environmental contamination. Furthermore, conventional CRBN, explosives and firearm detection devices do not provide tracking capability in time and space. Moreover, conventional CRBN, explosives and firearm detection devices are often prone to false detection and/or missed detection.

It would, therefore, be desirable to provide to a CRBN, explosives, and/or firearm detection system which provides accurate and reliable detection, localization, and tracking in non-contained wide spaces.

Figure 6A:
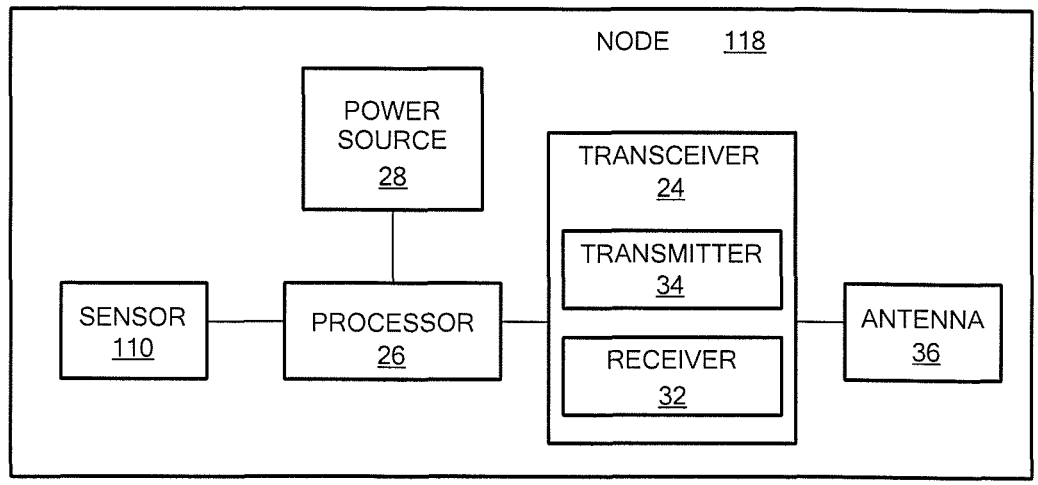
FIG. 6A is another example of a node in the intrusion detection and tracking system.

Referring to FIG. 6A, the nodes 18, 18' (FIG. 2) may be modified to include a sensor 110 coupled to the processor 26 to gather additional information to form a node 118. For example, the sensor 110 is selected to detect a desired type of threat. In one example, the sensor 110 may be used to detect CRBN material, explosives (such as improvised explosive devices (IEDs)) and firearms material along with their handlers. In one example, the sensor 110 is provided as commercial off-the-shelf (COTS) sensor to detect CRBN, explosives, and/or firearm materials (collectively referred to herein as CRBNE material).

The intrusion detection and tracking system 10 may then be modified to correlate the detection and tracking system data with sensor data from the sensor 110 to provide a system with desired levels of False Alarm Ratio (FAR) and Probability of detection (Pd).

In some examples, the sensor 110 may be physically separate from the remaining components of the node 118, but electrically coupled to the processor 26 (i.e., the sensor 110 is not physically integrated in a single or common mechanical package such as a SoC with the processor 26, the transceiver 24, the antenna 36, the battery 28 and the solar panels 30, for example). The data from the sensor 110 may be broadcast, for example, during the broadcast in processing block 64 (See FIG. 4A).

Figure 6B:
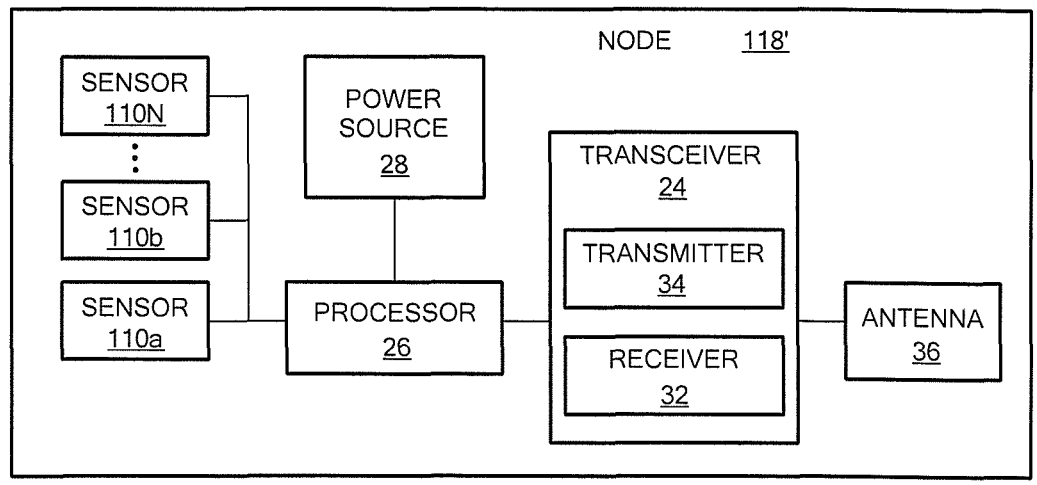
FIG. 6B is a further example of a node in the intrusion detection and tracking system.

Referring to FIG. 6B, in other examples, a node 118' may be similar to the node 118 but includes more than one sensor (e.g., a sensor 110a, a sensor 110b, . . . , and a sensor 110N). In one example, one or more of the sensors 110a-110N is a CRBNE sensor, which measures a different physical quantity, element or material. For example, if a single node 118' has four different CRBNE sensors coupled thereto, it is preferable that each of the four sensors measures or detects the presence of a different element or material. For example, a first sensor could measure or detect the presence of chemical materials or events, a second sensor could measure or detect the presence of radiological materials or events, a third sensor could measure or detect the presence of biological materials or events, and a fourth sensor could measure or detect the presence of nuclear material or events.

Figure 7A:
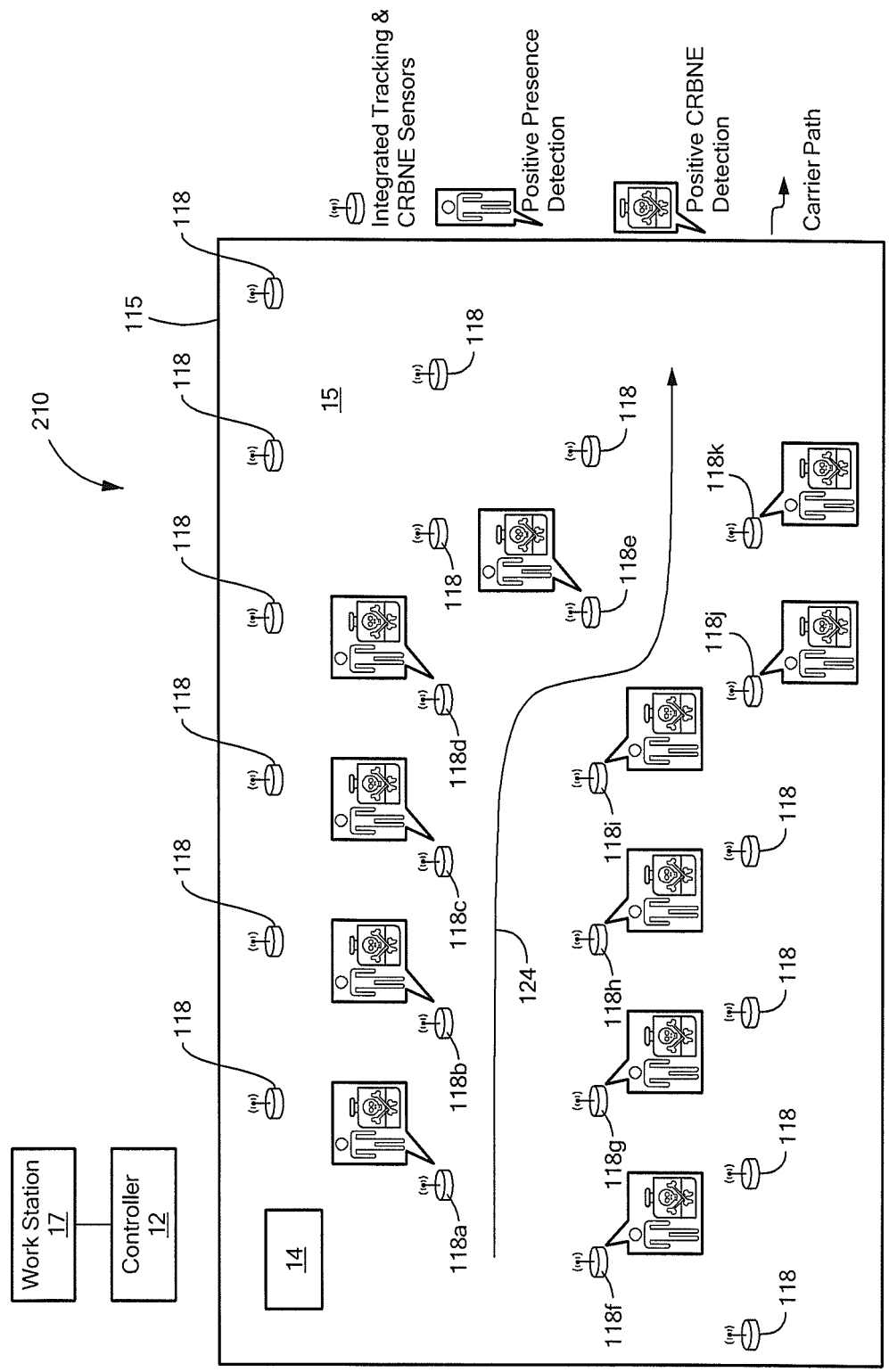
FIG. 7A is a block diagram of an example of an intrusion detection and tracking system tracking a person with CRBNE material.

Referring now to FIG. 7A, an intrusion detection and tracking system 210 includes a plurality of nodes 118. Objects detected using changes in the EMF field are combined with information obtained from the sensors 110 (e.g., CRBNE sensors) to accurately and reliably detect, discriminate and track materials and their handlers.

The system 210 detects and tracks objects as described above with respect to system 10 and FIGS. 4A to 4C but also uses data from sensors 110 to greatly improve the levels of false alarm ratio (FAR) and probability of detection (Pd). This is accomplished by combining information from the detection and tracking sensor portion of integrated sensor with the information from the CRBNE portion of integrated sensor 118.

In a steady-state mode, the sensors 110 continuously monitor the area 15 in order to establish the presence of foreign objects (such as a person). Additionally, each sensor 110 performs a detection cycle in order to establish a steady state CRBN level.

When the presence of a foreign object is detected by the node 118, a track is established and simultaneously locally coupled CRBNE sensors are commanded to perform one or more detection cycles in order to ascertain the presence of CRBNE material in the vicinity of the foreign object. If a positive CRBNE detection is substantiated, which is above the steady state CRBNE level, the established track is tagged with the presence of the specific detected CRBNE material. Given this starting point, multiple scenarios are possible, as established and orchestrated by further processing.

For example, in one scenario, as a tracked object begins to proceed along a path 124 across a monitored space 115, an initial pair of neighboring nodes 118a, 118f along the track path 124 also detects the presence of the object. Simultaneously the sensors 110 of the neighboring nodes of nodes 118a, 118f also declare positive detection of CRBNE material which is above the steady state CRBNE level.

Since both nodes 118a, 118f detect consistent information, this constitutes a positive CRBN detection with a high level of confidence. Additionally it confirms that the object (e.g., a person) is carrying or otherwise transporting CRBNE material. As the object moves along the path 124, subsequent detections occur at additional nodes 118b-118e and 118g-118k.

Figure 7B:
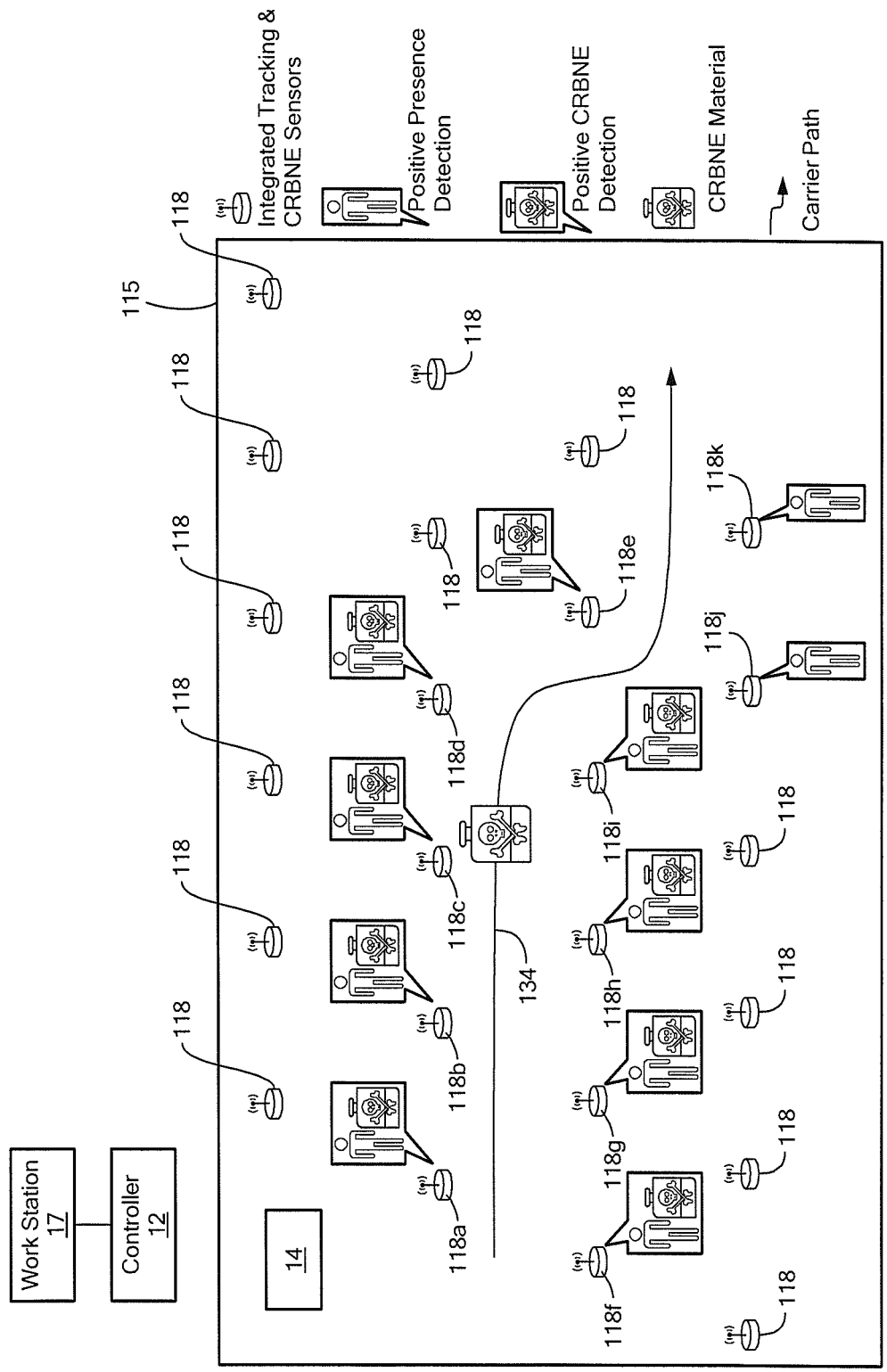
FIG. 7B is a block diagram of another example of an intrusion detection and tracking system tracking a person with CRBNE material.

Referring now to FIG. 7B in which like elements of FIG. 7B are provided having like reference designations, if the subsequent CRBNE detections at one of the detecting devices along the track path 124 maintains a high CRBNE level, after the track has proceeded past its location, it is indicative that the carrier has disposed of all or some of the CRBNE material in the vicinity of the device.

In FIG. 7B, for example, sensors 118d and 118i continue to detect high CRBNE levels after the object has proceeded past their locations while sensors 118e, 118j, 118k do not detect high CRBNE levels. This indicates the object (e.g., a person) carrying or otherwise transporting the device has disposed of all or some of the CRBNE material in the vicinity of sensors 118d, 118i.

The relative amount still being carried by the person can be calculated by comparing the initial CRBNE level and the CRBNE current level. If the continuous detected CRBNE levels by the new detecting sensors are much reduced, it is most likely the lingering residual CRBNE material.

In another exemplary scenario, as a tracked object proceeds across a monitored space, one or more neighboring tracking devices along the track path also detect the presence of the object. However the sensors 110 of the neighboring nodes 118 do not declare a positive detection of CRBNE material. In this exemplary scenario, various sub-scenarios are possible.

For example, in one sub-scenario, the sensor 110 continuously declares a positive CRBNE detection. In this situation, it is highly likely that the person being tracked has disposed of the CRBNE material in the vicinity of the initial detecting device. This is the case of CRBNE material that does not leave residual material on the carrier.

If the initial sensor 110 no longer declares a positive CRBNE detection, this is indicative of a false detection. If, on the other hand, a CRBNE device declares a high CRBNE level detection during a periodic steady state detection cycle, without the presence of any object in the surrounding space (as would have been detected by the tracking devices if such an object is present), then this is an indication that this is a case of environmental contamination. However, such "contamination" detection is not completely discarded. Rather, it is maintained by the controller 12 and correlated with other subsequent such "contamination" detections being declared by other surrounding sensors 110. Given the location of the sensors 110 and the various CRBNE levels being detected, the direction of the originating CRBNE material can be determined by the controller 12, as well as its approximate location, which is extrapolated using the decay of the detected CRBNE levels.

Figure 8:
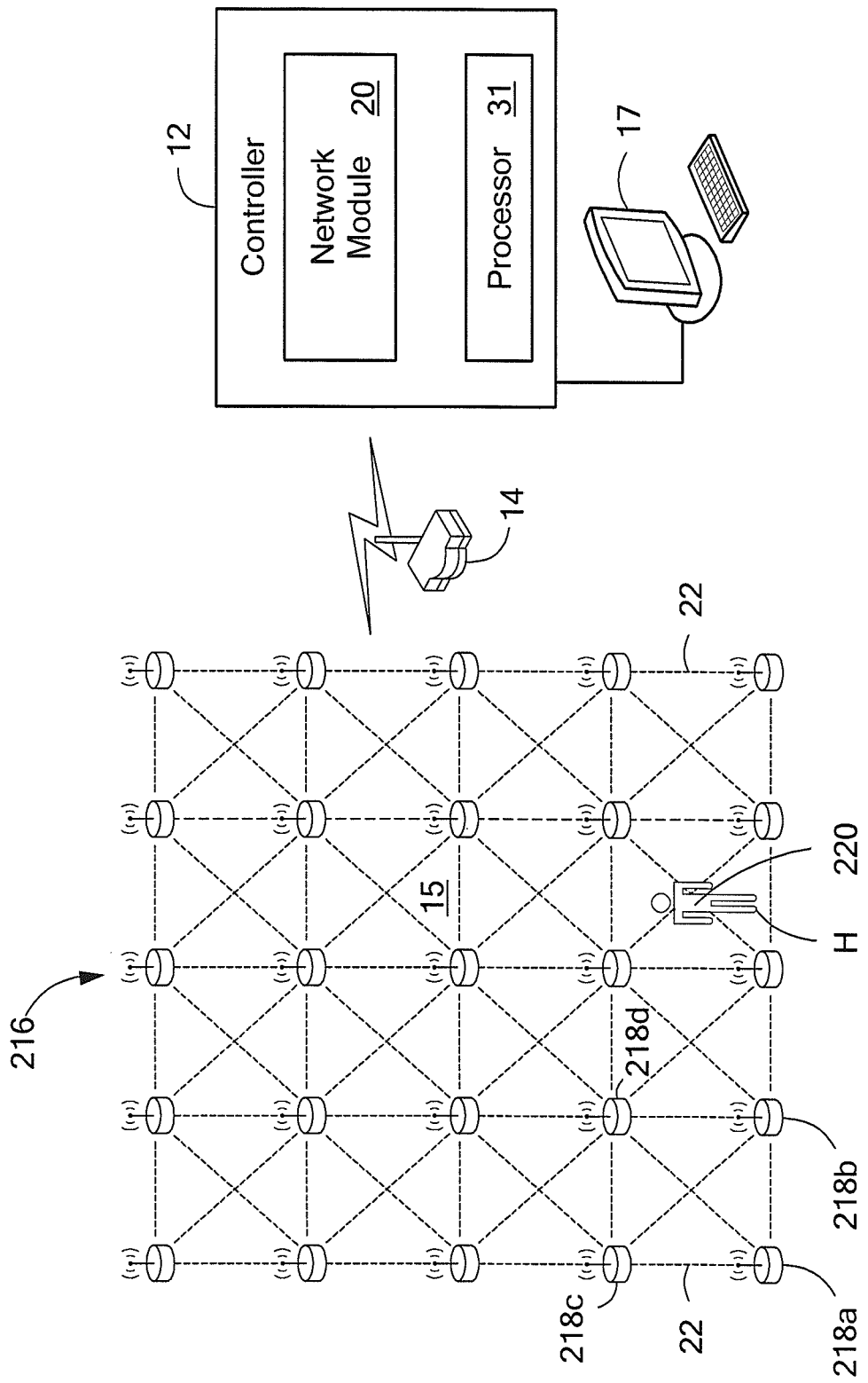
FIG. 8 is a block diagram of an example of an intrusion detection and tracking system using a beacon node.

Referring to FIG. 8, an intrusion detection and tracking system 210 includes a network 216 that includes nodes 218a, nodes 218b, nodes 218c, nodes 218d and so forth (a node in the network 216 is generically referred to as a node 218) for monitoring the area 15. In addition to detecting and tracking intrusions similar to system 10 (FIG. 1), the system 210 provides cooperative tracking and monitoring using transient beacon nodes 220 (e.g., transient beacon SoCs worn by a human H). In one example, transient beacon node 220 may be worn by emergency personnel and used to cooperatively locate, track, and monitor a carrier (of the beacon node 220) as they proceed across the surveillance area 15. The beacon node 220 may also be used to convey vital data pertaining to the carrier back to the workstation 17.

In one example, the transient beacon node 220 listens for the broadcast transmission of a node 218 in order to synchronize and trigger their transmission time slot. As a transient beacon node 220 receives the broadcast transmissions from the nodes 218, the beacon node 220 stores the received signal characteristics tagged with the ID of the broadcasting node 118.

At the appropriate time, the transient beacon node 220 broadcasts its beacon data, which contains its ID, along with any vital data collected by the wearer (such as body temperature, heart rate, oxygen supply level, surrounding hazardous fumes and/or gasses measured by sensors integrated into the transient beacon nodes), and along with the collected received signal characteristics data. Upon receipt of the beacon data, neighboring surrounding nodes 218 perform the beacon processing, which includes processing of the received beacon signal characteristics. If positive beacon criteria are met, the nodes 218 retransmit the beacon data tagged with the receiving node ID, and the received beacon signal characteristics, to the access point 14, which are transmitted from the access point 14 to the controller 12. Since each beacon broadcast is received by multiple neighboring nodes 218, a single beacon broadcast might result in multiple beacon data being generated by the neighboring nodes 18 and transmitted through the access point 14 to the controller 12.

The controller 12 correlates the beacon data with other received beacon data with the same beacon ID and any existing beacon track (corresponding to that beacon ID). The corresponding beacon 3D track coordinates are calculated from the 3D coordinates of the contributing nodes 218 and the corresponding beacon magnitude levels. Additionally, the beacon tracks are correlated with the detection tracks generated by the non-cooperative processing.

Figure 9:
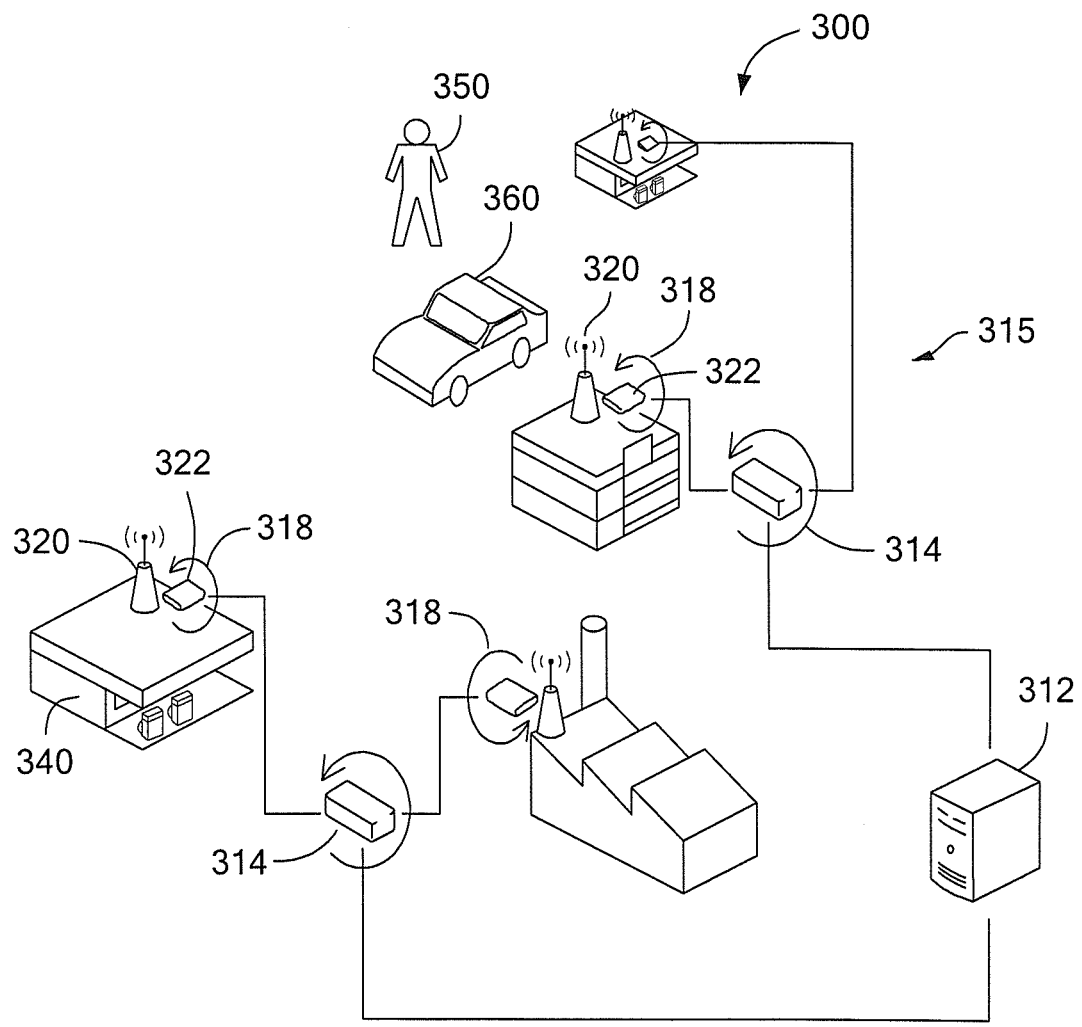
FIG. 9 is a block diagram of an example of an intrusion detection and tracking system for surveillance over a large area.

Referring to FIG. 9, an intrusion detection and tracking system 300 may be used to monitor an area 315 to detect and track a human 350 and/or a vehicle 360 (e.g., a ground vehicle). In one example, the area 315 may be a large area such as a city or other large geographical areas. The system 300 includes nodes 318, access points 314 and a controller 312. Each of the nodes 318 includes a processor 322 and an antenna 320. A node 318 may be disposed on a building 340. The antenna 320 may be a WiFi/WiMAX device. In one example, the processor 322 performs the process 50 and determines a received signal strength and link quality from signals received from other nodes. In one example, the access point 314 performs the process 70 and the controller 312 performs the process 80.

Figure 10:
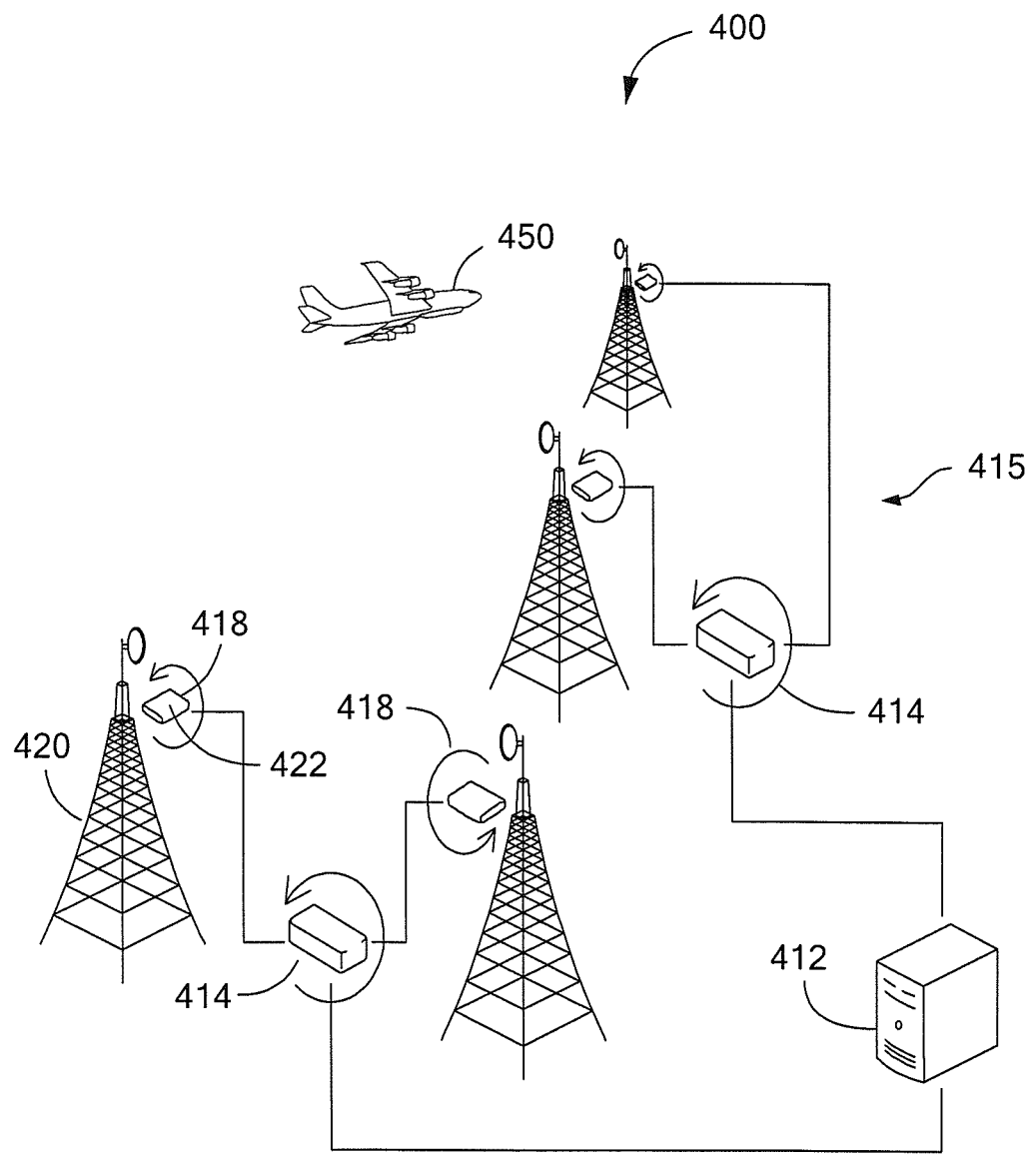
FIG. 10 is a block diagram of another example of an intrusion detection and tracking system for surveillance over a large area.

Referring to FIG. 10, an intrusion detection and tracking system 400 may be used monitor an area 415 to detect and track large objects such as an airplane 450. In one example, the area 415 may be a large area such as a city or other large geographical areas. The system 400 includes nodes 418, access points 414 and a controller 412. Each of the nodes 418 includes a processor 422 and an antenna 420. In one example, the antenna 420 may be a cellular transceiver such as a cell phone tower, for example. In one example, the processor 422 performs the process 50 and determines a received signal strength and link quality from signals received from other nodes. In one example, the access point 414 performs the process 70 and the controller 412 performs the process 80.

The processes described herein (e.g., processes 50, 70, 80) are not limited to use with the hardware and software of FIG. 5; they may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform one or more of the processing blocks of the processes 50, 70, 80, for example, and to generate output information.

The processes described herein are not limited to the specific embodiments described herein. For example, the processes are not limited to the specific processing order of the process steps in FIGS. 4A to 4C. Rather, any of the processing steps of FIGS. 4A to 4C may be re-ordered, combined or removed, performed in parallel or in serial, as necessary, to achieve the results set forth above.

Process blocks in FIGS. 4A to 4C associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

While the invention is shown and described in conjunction with a particular embodiment having an illustrative architecture having certain components in a given order, it is understood that other embodiments well within the scope of the invention are contemplated having more and fewer components, having different types of components, and being coupled in various arrangements. Such embodiments will be readily apparent to one of ordinary skill in the art. All documents cited herein are incorporated herein by reference. Other embodiments not specifically described herein are also within the scope of the following claims.

What is claimed is:

1. A method to detect an object in an area, comprising:
  forming a wireless network among a plurality of nodes, each of the nodes being configured to generate an electromagnetic field (EMF) in the area;
  determining changes in the EMF between two nodes based on:
  a first difference in received signal strength values between a previously determined received signal strength value and a currently determined received signal strength value,
  a second difference in received signal strength values between the currently determined received signal strength value and an average received signal strength value and
  a third difference in link quality values between a previously determined link quality value and a currently determined link quality value; and detecting the object based on the changes in the EMF; wherein the received signal strength values and link quality values are values in a frame formatted and transmitted in accordance with a communications protocol.

2. The method of claim 1 wherein the first difference in received signal strength values comprises a difference in received signal strength indicator (RSSI) values between a previously determined RSSI value and a currently determined RSSI value,
wherein the second difference in received signal strength values comprises a difference in RSSI values between the currently determined RSSI value and an average RSSI value, and
wherein the third difference in link quality values comprises a difference in link quality indicator (LQI) values between a previously determined LQI value and a currently determined LQI value.

3. The method of claim 1 wherein determining changes in the EMF comprises determining a measurement value (MV) at a first node based on a signal received at the first node from a second node, the MV being equal to:

$$|k\Delta_1|+|l\Delta_2|+|m\Delta_3|,$$

where, k, l and m are constants, $\Delta_1$ is the first difference in received signal strength values, $\Delta_2$ is the second difference in received signal strength values and $\Delta_3$ is the third difference in link quality values.

4. The method of claim 3, further comprising transmitting the measurement value from the first node to an access point if the measurement value is above a measurement value threshold.

5. The method of claim 4, further comprising transmitting a detection from the access point to a controller if a number of measurement values received at the access point in a cycle exceeds a detection threshold.

6. The method of claim 5 wherein transmitting a detection comprises transmitting a detection of one of a human, a vehicle and an airplane.

7. The method of claim 5, further comprising tracking the object at the controller in response to detections received from the access point.

8. The method of claim 1, further comprising disposing the plurality of nodes throughout a building.

9. The method of claim 1, further comprising disposing a first node on a first building and disposing a second node on a second building.

10. The method of claim 1, further comprising correlating the object detected by determining changes in the EMF with a detection by the sensor.

11. The method of claim 10 wherein correlating the object detected by determining changes in the EMF with a detection by the sensor comprises correlating the object detected by analyzing changes in the EMF with a detection by a chemical, radiological, biological, and nuclear (CRBN), explosives, and/or firearm materials (CBRNE) sensor.

12. The method of claim 1, further comprising:
receiving, at one or more of the plurality of nodes, data from a beacon; and
correlating the object detected with the data from the beacon.

13. The method of claim 12 wherein receiving data from the beacon comprises receiving at least one of a beacon ID and vital data collected by a wearer of the beacon.

14. The method of claim 13 wherein the vital data comprises body temperature, heart rate, oxygen supply level, surrounding hazardous fumes, and/or gasses measured by sensors integrated into the beacon.

15. A system to detect an object in an area comprising:
a plurality of nodes, each node comprising at least one processor and configured to generate an electromagnetic field (EMF) in the area;
wherein each node is configured to determine changes in the EMF between two nodes based on a first difference in received signal strength values between a previously determined received signal strength value and a currently determined received signal strength value, a second difference in received signal strength values between the currently determined received signal strength value and an average received signal strength value and a third difference in link quality values between a previously determined link quality value and a currently determined link quality value, wherein the system detects an object based on changes in the EMF;
wherein the received signal strength values and link quality values are values in a frame formatted and transmitted in accordance with a communications protocol.

16. The system of claim 15 wherein the first difference in received signal strength values comprises a difference in received signal strength indicator (RSSI) values between a previously determined RSSI value and a currently determined RSSI value,
wherein the second difference in received signal strength values comprises a difference in RSSI values between the currently determined RSSI value and an average RSSI value, and
wherein the third difference in link quality values comprises a difference in link quality indicator (LQI) values between a previously determined LQI value and a currently determined LQI value.

17. The system of claim 15 wherein determining changes in the EMF comprises determining a measurement value (MV) at a first node based on a signal received at the first node transmitted by a second node, the MV being equal to:

$$|k\Delta_1|+|l\Delta_2|+|m\Delta_3|,$$

where, k, l and m are constants, $\Delta_1$ is the first difference in received signal strength values, $\Delta_2$ is the second difference in received signal strength values and $\Delta_3$ is the third difference in link quality values.

18. The system of claim 17, further comprising an access point,
wherein each node is further configured to transmit the measurement value from the first node to the access point if the measurement value is above a measurement value threshold,
wherein the access point is configured to transmit a detection of an object to a controller if a number of measurement values received at the access point in a cycle exceeds a detection value threshold, and
wherein the controller is configured to track the object in response to detections received from the access point.

19. The system of claim 15, further comprising a controller configured to correlate an object detected with a detection from the sensor,
wherein the sensor is a chemical, radiological, biological, and nuclear (CRBN), explosives, and/or firearm materials (CBRNE) sensor.

20. The system of claim 15, further comprising a controller configured to correlate an object detected with data from a beacon,
wherein the data from the beacon comprises at least one of a beacon ID and vital data collected by a wearer of the beacon, and
wherein the vital data comprises body temperature, heart rate, oxygen supply level, surrounding hazardous fumes and/or gasses measured by sensors integrated into the beacon.

21. An article comprising:
a non-transitory machine-readable medium that stores executable instructions to detect an object, the instructions causing a machine to:

determine changes in the EMF between two nodes based on a first difference in received signal strength values between a previously determined received signal strength value and a currently determined received signal strength value, a second difference in received signal strength values between the currently determined received signal strength value and an average received signal strength value and a third difference in link quality values between a previously determined link quality value and a currently determined link quality value; wherein the received signal strength values and link quality values are values in a frame formatted and transmitted in accordance with a communications protocol.

22. The article of claim 21 wherein the instructions causing the machine to determine changes in the EMF comprises instructions causing a machine to determine a measurement value (MV) at a first node based on a signal received at the first node from a second node, the MV being equal to:

$$|k\Delta_1|+|l\Delta_2|+|m\Delta_3|,$$

where, k, l and m are constants, $\Delta_1$ is the first difference in received signal strength values, $\Delta_2$ is the second difference in received signal strength values and $\Delta_3$ is the third difference in link quality values.

23. The article of claim 21 wherein the first difference in received signal strength values comprises a difference in received signal strength indicator (RSSI) values between a previously determined RSSI value and a currently determined RSSI value, wherein the second difference in received signal strength values comprises a difference in RSSI values between the currently determined RSSI value and an average RSSI value, and wherein the third difference in link quality values comprises a difference in link quality indicator (LQI) values between a previously determined LQI value and a currently determined LQI value.

* * * * *